United States Patent [19]

Drees et al.

[11] 4,333,728

[45] Jun. 8, 1982

[54] COMPOUND HUB SPRING SYSTEM FOR HELICOPTERS

[75] Inventors: Jan M. Drees, Dallas County; Larry W. Dooley; William D. Neathery, both of Tarrant County, all of Tex.

[73] Assignee: Textron, Inc., Providence, R.I.

[21] Appl. No.: 70,877

[22] Filed: Aug. 29, 1979

Related U.S. Application Data

[63] Continuation-in-part of Ser. No. 823,624, Aug. 11, 1977, abandoned.

[51] Int. Cl.³ .............................................. B64C 27/52
[52] U.S. Cl. .................. 416/134 A; 416/140; 416/148
[58] Field of Search ............... 416/134 A, 140 A, 102, 416/107, 148, 138 A

[56] References Cited

U.S. PATENT DOCUMENTS

| | | | |
|---|---|---|---|
| 2,640,553 | 6/1953 | Hafner | 416/106 |
| 2,949,965 | 8/1960 | DeTore et al. | 416/102 X |
| 3,288,226 | 11/1966 | Lemont et al. | 416/135 |
| 3,378,083 | 4/1968 | Lichten et al. | 416/140 |
| 3,790,302 | 2/1974 | Pascher | 416/134 |
| 3,804,552 | 4/1974 | Corington | 416/134 |
| 3,807,896 | 4/1974 | Johnson | 416/102 |
| 3,912,199 | 10/1975 | Seibel et al. | 244/17.11 |

FOREIGN PATENT DOCUMENTS

| | | | |
|---|---|---|---|
| 272974 | 6/1927 | United Kingdom | 416/140 A |
| 438111 | 11/1935 | United Kingdom | 416/132 R |
| 751109 | 6/1958 | United Kingdom | 416/102 |

*Primary Examiner*—Everette A. Powell, Jr.
*Attorney, Agent, or Firm*—Richards, Harris & Medlock

[57] ABSTRACT

A system for opposing helicopter blade flapping applies restraining forces at a low spring rate at low flap angles and at a high spring rate at flap angles greater than a predetermined angle. More particularly, bearings rotatably support the blade yoke on rotor hub trunnions which form a flapping axis. A resilient mechanical coupling between the blade yokes and the hub trunnion applies a restraining force having a characteristic linear with flapping angle. A second restraint mounted to rotate about the flapping axis with the rotor, applies a nonlinear restraining force which preferably rapidly increases beginning at a predetermined flap angle, and over the range short of hard flapping contact between the rotor and the rotor mast.

14 Claims, 13 Drawing Figures

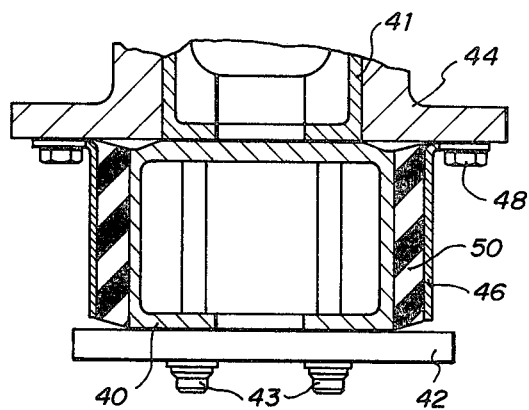
FIG. 4
FIG. 3
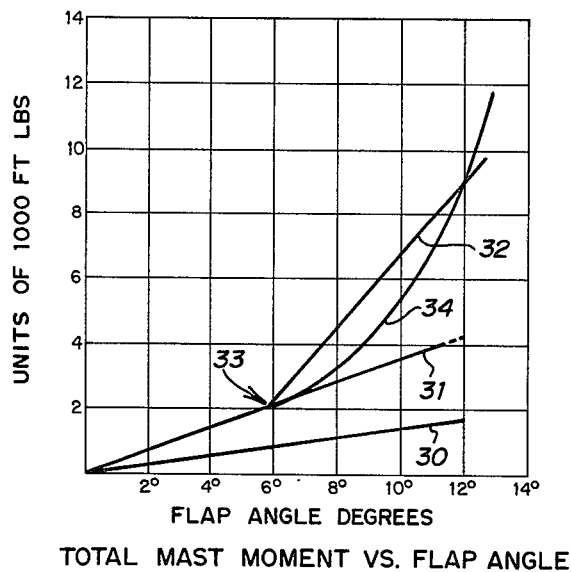
TOTAL MAST MOMENT VS. FLAP ANGLE
FIG. 6
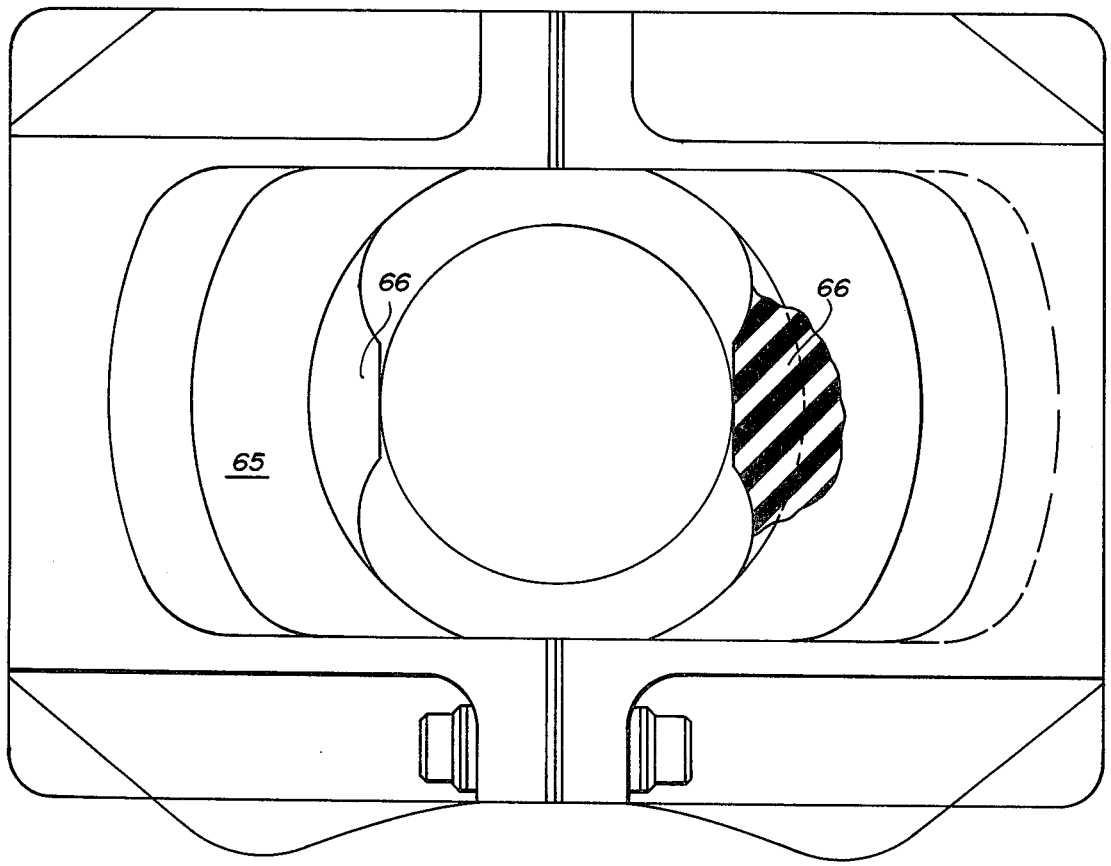

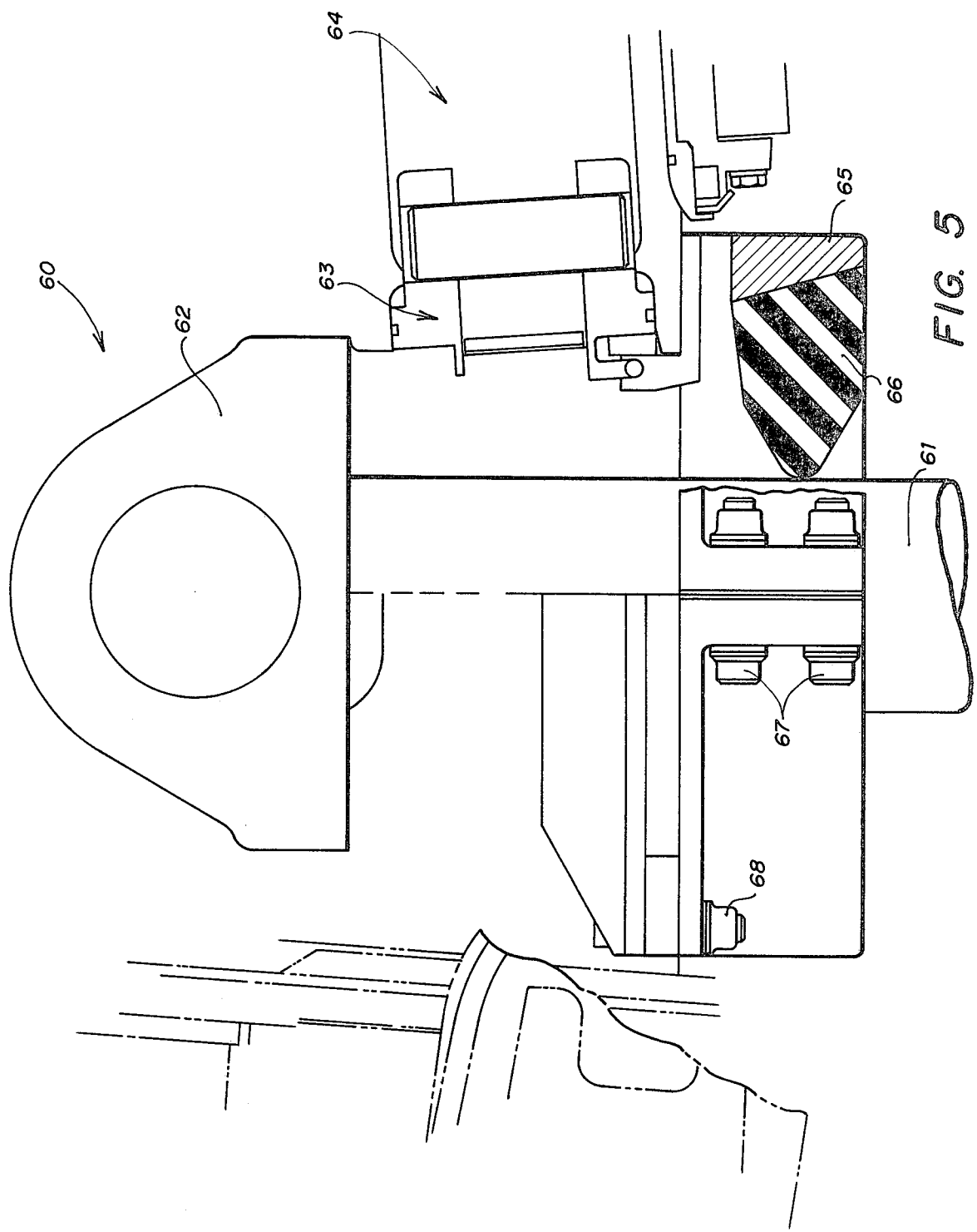

COMPOUND HUB SPRING SYSTEM FOR HELICOPTERS

CROSS REFERENCE TO RELATED APPLICATION

This application is a continuation-in-part of application Ser. No. 823,624, filed Aug. 11, 1977, now abandoned.

FIELD OF THE INVENTION

This invention relates to the control of flapping in teetering helicopter blades, and more particularly to a compound hub spring system having nonlinear spring characteristics.

PRIOR ART

It is known to provide a teetering rotor helicopter with hub springs in order to oppose and minimize flapping tendencies in the blades during flight maneuvers. In U.S. Pat. No. 3,807,896 a pair of concentric tubes extend along the teetering axis, and are coupled between the blade and mast to oppose, by torsion, the flapping of the blades. In U.S. Pat. No. 3,804,552 an elastomeric bearing is mounted between a rotor yoke flange which rotates with the blades about the flapping axis, and a main mast flange that is fixed to the mast.

The presence of a hub spring induces forces which oppose flapping. Depending upon the spring rate, greater or less vibration in the airframe may occur by way of the mast. High spring rates are desired during flight maneuvers in order to prevent excess flapping. Large flapping amplitudes can occur if the helicopter is operated at an extreme center of gravity, in low or negative G maneuvers, with abrupt or cyclic control inputs, or in conditions causing retreating blade stall. Flapping outside the recommended operational envelope can result in damage from hard contact with flapping stops on the mast and/or even contact with the airframe. Under level flight conditions, however, low spring rates are desirable in order to minimize vibration and improve stability.

In accordance with the present invention, a compound hub spring system is provided wherein a low flap angles the spring rate is low. Beginning at a predetermined flap angle, the spring rate is increased. The increase in spring rate can be tailored to a desired transition characteristic to avoid or minimize hard contact between the rotor and the mast during high flap angles.

SUMMARY OF THE INVENTION

A compound hub spring structure for controlling flapping in main helicopter rotor blades is provided. The structure applies a restraining force of one spring rate at low flap angles, and a restraining force of a relatively higher spring rate at flap angles greater than a predetermined flap angle. In addition to a reduction in main rotor flapping, the hub spring system herein results in increased control power particularly in low G flight, increased vibration damping, and extended CG range. The invention is particularly adapted for retrofit installation with little or no modification of the helicopter mast or rotor hub. The present invention improves stability, controllability, and handling.

More particularly, the main helicopter rotor blades are coupled to the main rotor by structure exerting a linear first restraining force at a low spring rate. Further, structure such as a resilient member mounted for rotation with the rotor about the flapping axis applies a second restraining force exhibiting a higher spring rate characteristic prior to hard contact between the rotor and the mast.

In one aspect of the invention, the spring rate of the resilient member increases as the blade flapping angle increases for angles beyond a predetermined flap angle.

In a further aspect, the spring rate of the resilient member is controlled by varying the area of the contact zone between the resilient member and the mast, to provide a steeper nonlinear increase in spring rate as the flapping angle increases.

DESCRIPTION OF THE DRAWINGS

The novel features believed characteristic of the invention are set forth in the appended claims. The invention itself, however, as well as further objects and advantages thereof, will best be understood by reference to the following Detailed Description of an illustrative embodiment taken in conjunction with the accompanying Drawings, in which:

FIG. 3 is a graph illustrating the operation of the present invention;

FIG. 4 is a sectional view of a rectangular hub spring in combination with tubular resilient pads in accordance with a modification of the invention;

FIG. 5 is a side sectional view of another modified mast-yoke coupling having a tapered resilient block for nonlinear spring action;

FIG. 6 is a top view of the coupling of FIG. 5 taken partially in section to further illustrate the resilient block;

DESCRIPTION OF PREFERRED EMBODIMENTS

Figure 1:
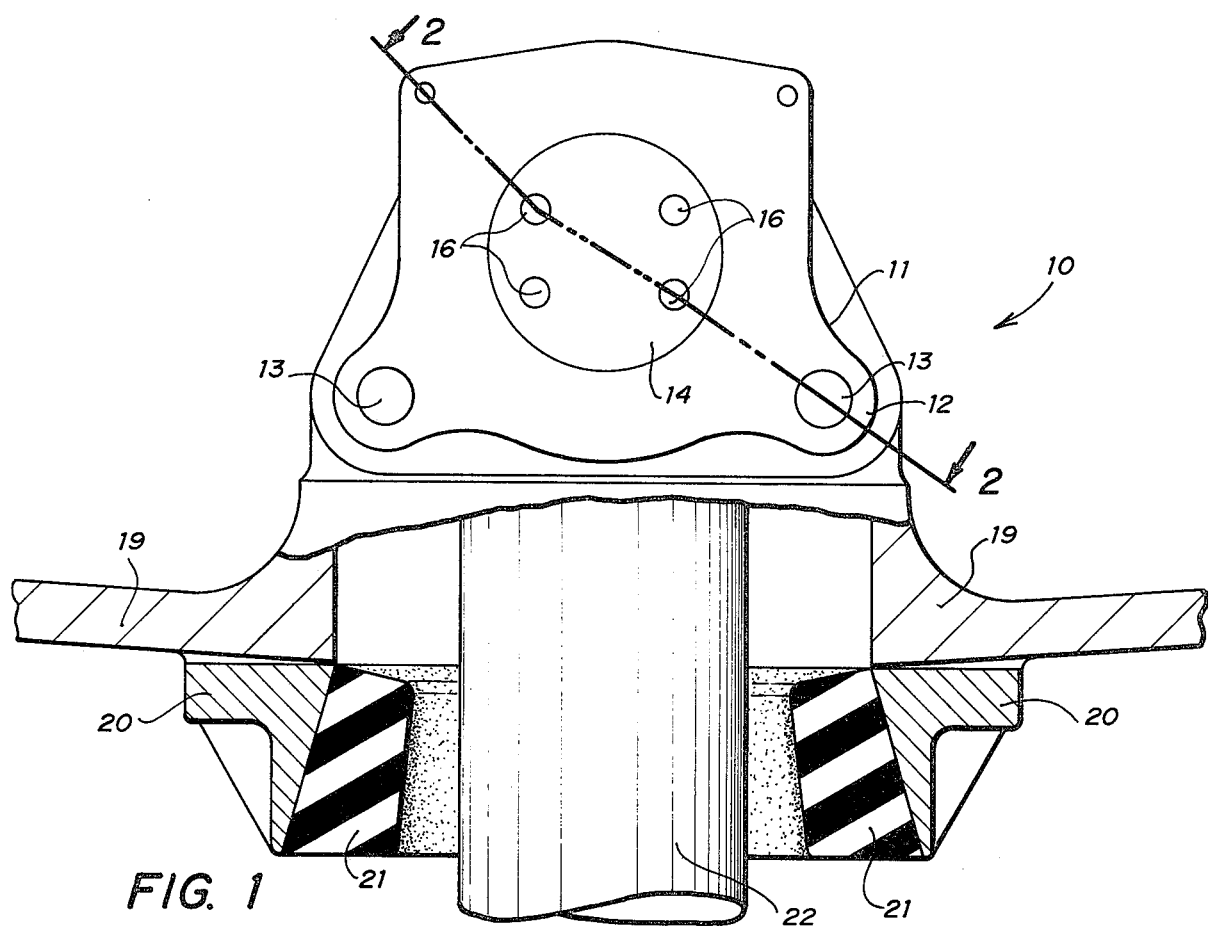
FIG. 1 is a side view partially in section of a mast-yoke coupling illustrative of a first embodiment of the present invention.
Figure 2:
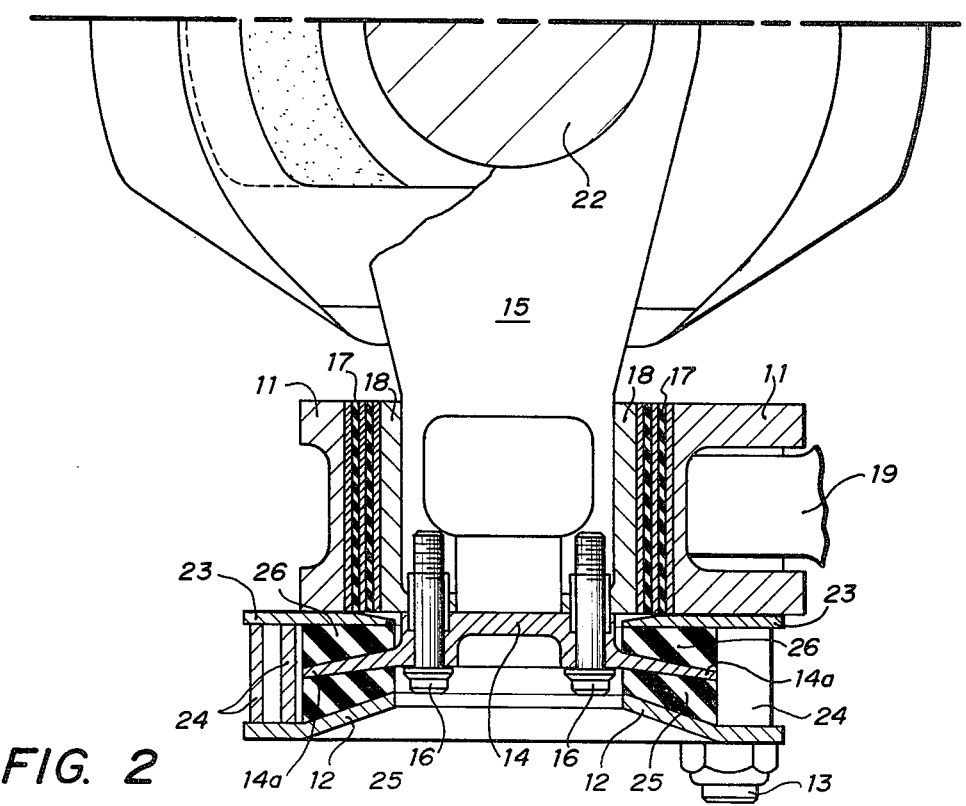
FIG. 2 is a top view partially in section of the coupling of FIG. 1 taken along lines 2—2.
Figure 7:
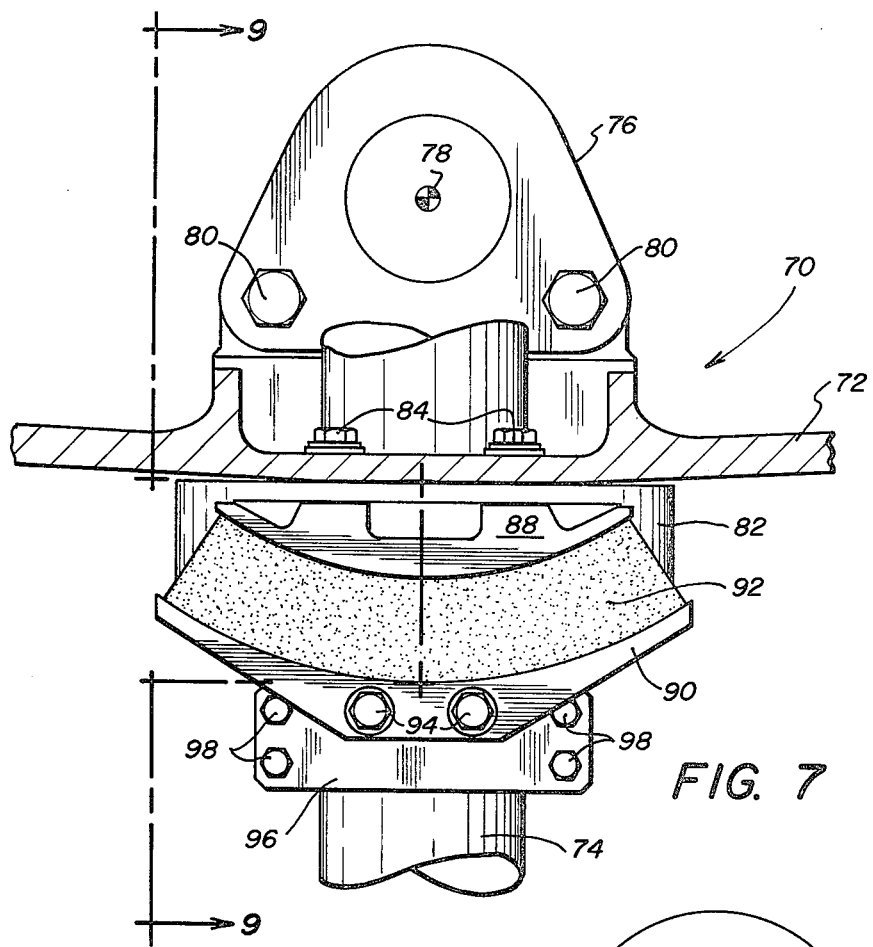
FIG. 7 is a side view partially in section of a mast-yoke coupling illustrative of a second embodiment of the invention.

FIGS. 1 and 2

FIGS. 1 and 2 illustrate a mast-yoke coupling 10 embodying a compound hub spring structure in accordance with the invention.

Coupling 10 includes a pillow block 11 with an outer bearing plate 12 secured to the pillow block by means of bolts 13. A hub spring plate 14 is secured to a hub trunnion 15 by means of bolts 16. The pillow block 11 is coupled to the hub trunnion 15 by means of an elastomeric bearing 17 formed on a cylinder 18 in a bore in pillow block 11. Cylinder 18 is secured to the trunnion 15 by the bolts 16.

The bearing 17 is comprised of laminated elastomeric cylinders interleaved with thin metallic cylinders located between the pillow block 11 and the inner cylinder 18.

A yoke 19 is formed integral with pillow block 11 and carries a ring 20 at the lower surface of the yoke 19. A resilient elastomeric circular block 21 is adhered to the inner walls of the ring 20 concentric to main rotor mast 22. The inner surface of block 21 is conical with the apex located at the axis of trunnion 15.

Flange 14a of plate 14 extends between plate 12 and an inner plate 23 contiguous to pillow block 11. Plates 12 and 23 are secured together by spacers 24, and are secured to pillow block 11 by bolts 13. Elastomeric shear pads 25 and 26 are adhered to confronting surfaces of plates 12 and 23 and to the surfaces of flange 14a.

In accordance with the invention, the elastomeric bearing 17 permits flapping of helicopter blades about the axis of trunnion 15. Plates 12 and 23, secured to pillow block 11, rotate with the pillow block upon blade flapping. As the plates 12 and 23 rotate, the pads 25 and 26 are subjected to a shearing force since flange 14a is fixed to trunnion 15.

During high flap angles ring 20 will approach mast 22. When block 21 comes in contact with the rotor mast, hard contact between the rotor mast and the assembly 10 is avoided or minimized. The pad 21 serves as a hub spring, applying a force opposing flapping that can be readily tailored to fit design criteria.

FIG. 3

FIG. 3 illustrates in graph form the force generated by the preferred embodiments of the present invention during helicopter blade flapping.

The restraining force generated by the elastomeric bearing 17 with increasing flap angle is illustrated by the line 30. The restraining force monotonically increases with increasing flap angle. The combined effect of the elastomeric bearing 17 and the shear pads 25 and 26 is illustrated by line 31. The combined restraining force is essentially linear but higher than that of elastomeric bearing 17 alone.

When the flap angle of the rotor assembly 10 is so great that the resilient block 21 contacts mast 22, the combined restraining force may be illustrated by the graph line 32 for one configuration of block 21. The compound hub spring structure thus provides a linear restraining force illustrated by the graph line 31 until the resilient block 21 engages the rotor mast 22 as indicated by a point 33. Thereafter, the restraining force increases at a greater rate as illustrated by the graph line 32. Since elastomeric material becomes inelastic under sufficient compression, it will be appreciated that block 21 can be tailored to apply a nonlinear restraining force as indicated by line 34.

FIG. 4

FIG. 4 illustrates a modified form of the hub spring comprising elements 12, 14a, and 26 of FIG. 2.

Referring to FIG. 4, a short cylinder 40 is secured to the outboard end of a hub trunnion 41 along with a plate 42 by means of bolts 43. Pillow block 44 houses a bearing for the hub trunnion 41, an outer cylinder 46 is secured to block 44 by means of bolts 48. An elastomeric cylindrical shear pad 50 is adhered to the outer surface of cylinder 40 and the inner surface of cylinder 46.

In operation a shearing force is applied to the shear pad 50 as pillow block 44 rotates about trunnion 41.

FIGS. 5 and 6

FIGS. 5 and 6 illustrate a modification to the compound hub spring structure of FIGS. 1 and 2.

More particularly, a rotor assembly 60 is mounted for rotation with a main rotor mast 61. The rotor assembly is comprised of a pillow block 62, a yoke 63 integral with the pillow block, and a grip 64 coupling a helicopter blade (not shown) to the yoke 63.

A ring 65 encircles the mast 61. A shaped elastomeric block 66 is adhered to the inner surfaces of each side of ring 65. The upper and lower surfaces of block 66 are conical and converge to a nose which engages mast 61. As best seen in FIG. 6 the block 66 is shaped to contact mast 61 at points which are perpendicular to the flapping axis. Block 66 preferably will be formed in two halves of like shape each adhered to half portions of ring 65 which are connected by bolts 67 and secured to yoke 63 by bolts 68. The split ring structure 65, 65a permits the nonlinear hub spring to be added to existing aircraft without undue modification.

Like the resilient block 21 of FIG. 1, the resilient blocks 66 can provide a nonlinear restraining force as illustrated by curve 34 of FIG. 3. The nonlinearity may be selected by adjustment of the shape of the block 66. With a fine nose contact, initial forces will be small, increasing as the area of contact with the mast 61 increases. It will be understood that the linear hub spring may be of the form disclosed in said U.S. Pat. No. 3,807,896. Thus, the restraining force generated by a compound hub spring structure comprising the elastomeric bearing 17, the shear pads 25 and 26 of FIG. 2, and the resilient block 66 may be illustrated by the line 31 for low flap angles as indicated to the left of point 33. When the rotor assembly 60 teeters with increasing flap angle, the resilient blocks 66 are deformed against the mast 61. Such a condition is illustrated by curve 34 to the right of point 33, wherein a nonlinear restraining force is generated to oppose the helicopter blade flapping.

FIGS. 7, 8, 9 and 10

FIGS. 7-10 illustrate a mast-yoke coupling 70 embodying a compound hub spring structure in accordance with a second embodiment of the invention.

Coupling 70 is connected between rotor yoke 72 and main rotor mast 74. The helicopter blades (not shown) are supported by yoke 72, which in turn is mounted on mast 74 by means of pillow block 76. Rotor yoke 72 is thus attached to mast 74 for rotation therewith, as well as for pivotal movement about a teetering axis extending transverse to the mast through point 78. The outer bearing plate of pillow block 76 is secured thereto by means of bolts 80. Pillow block 76 may be of similar construction to pillow block 11 shown in FIGS. 1 and 2, and may include an elastomeric bearing or other bearing structure suitable for supporting pivotal movement of rotor yoke 72.

Figure 10:
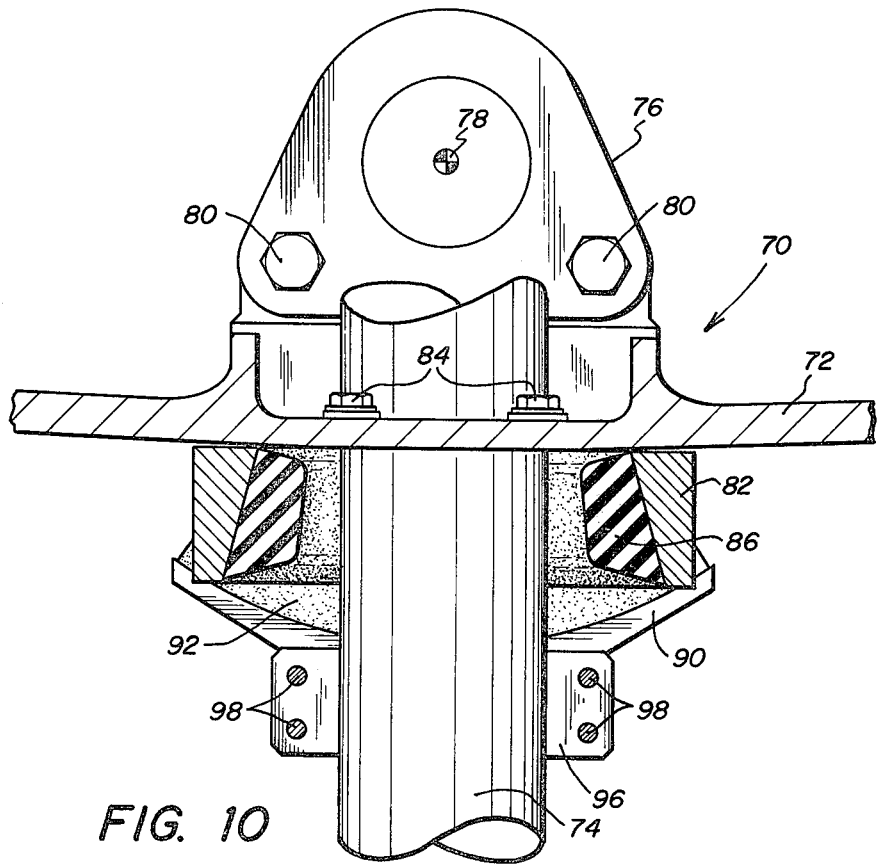
FIG. 10 is a section view taken along lines 10—10 of FIG. 9.
Figure 8:
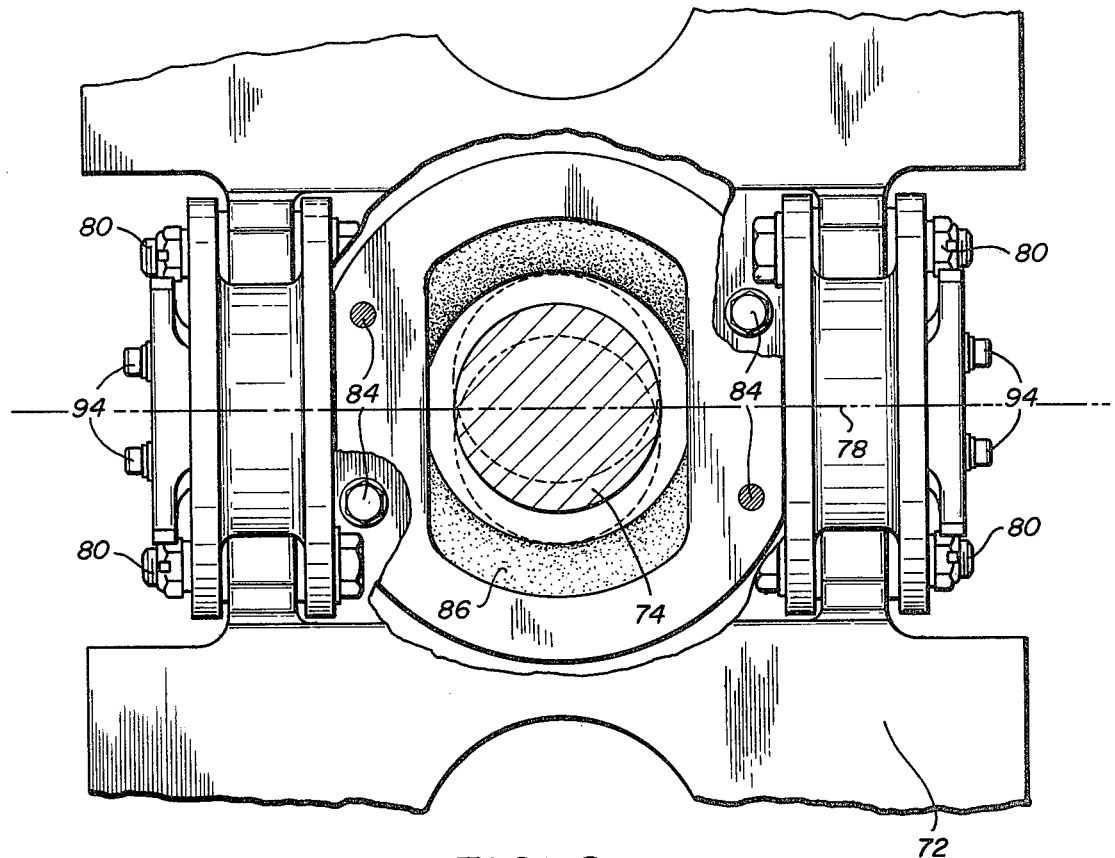
FIG. 8 is a top view partially cut away of the coupling of FIG. 7.
Figure 9:
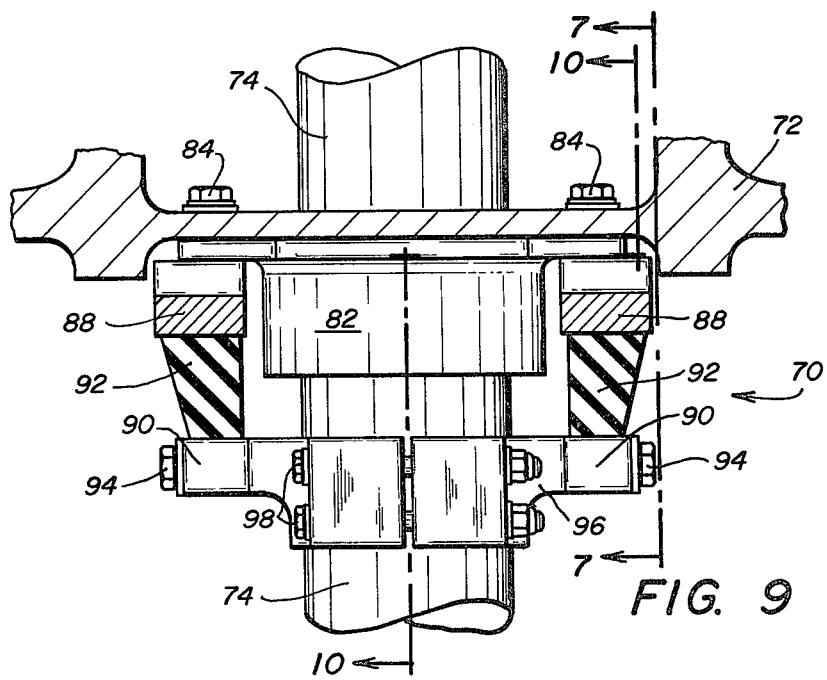
FIG. 9 is a vertical section view taken along lines 9—9 of FIG. 7.

Coupling 70 is mounted beneath rotor 72 and about mast 74. As best seen in FIG. 9, ring 82 has an upper flange through which bolts 84 pass to secure the flange 82a to yoke 72. As best seen in FIG. 8, the flange 82a has an elongated opening, the ends of the opening being circular. As seen in FIG. 9, ring 82 is a skirt depending from flange 82a which is wider than mast 74. Thus, the ring 82 is a non-circular ring or skirt to depending from flange 82a. The ring 82a is viewed in section in the longest dimension in FIG. 10. It is viewed in elevation showing its narrowest dimension in FIG. 9. Ring 82 surrounds mast 74 and is secured to yoke 72 by means of bolts 84. A resilient elastomeric snubber block 86 is adhered to the inner wall of ring 82. As is best shown in FIG. 10, the inner surface of block 86 is conical with the apex thereof being located along the longitudinal axis of mast 74 so that the side of the mast will be engaged by a vertical zone of the resilient block upon teetering beyond a predetermined flap angle, such as six degrees. Snubber block 86 thus provides a compressive bias to oppose flapping beyond a predetermined angle.

With reference to FIG. 8 in particular, it will be noted that the outside diameter of mast 74 is smaller than the inside diameter of snubber block 86. The position of mast 74 relative to block 86 at the predetermined flapping angle is shown in phantom lines. It will thus be understood that the opposing compression bias of snubber block 86 is applied through a contact zone which widens with increasing flap angle whereby an increasing restraining force is produced. Block 86 can be tailored to respond nonlinearly, as illustrated by line 34 in FIG. 3, or substantially linearly, as desired.

A pair of arcuate plates 88 positioned on opposite sides of mast 74 are also secured to ring 82 and yoke 72 by bolts 84. A corresponding lower arcuate plate 90 is provided for each upper arcuate plate 88. An elastomeric shear pad 92 is adhered between the confronting surfaces of each pair of plates 88 and 90. Bolts 94 secure lower arcuate plates 90 to lower ring 96 which is clamped to mast 74. Preferably, lower ring 96 is of split ring construction and is clamped to mast 74 by means of bolts 98. As rotor yoke 72 flaps about the teetering axis, the relative rotation between arcuate plates 88 and 90 is opposed by shear pads 92 with a shear bias which increases substantially linearly with flapping angle.

Figure 11:
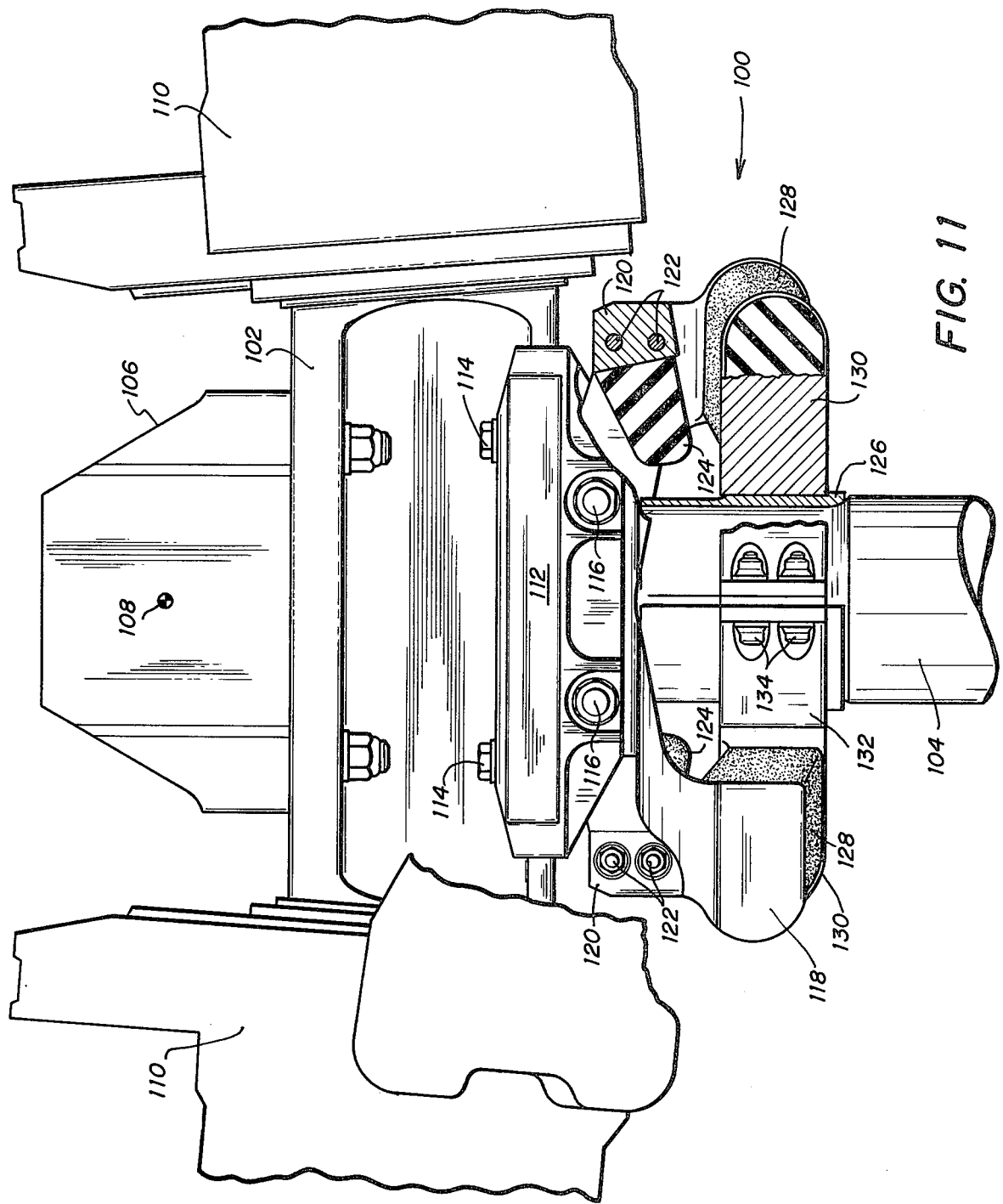
FIG. 11 is a side view partially in section of a mast-yoke coupling illustrative of a third embodiment of the invention.
Figure 12:
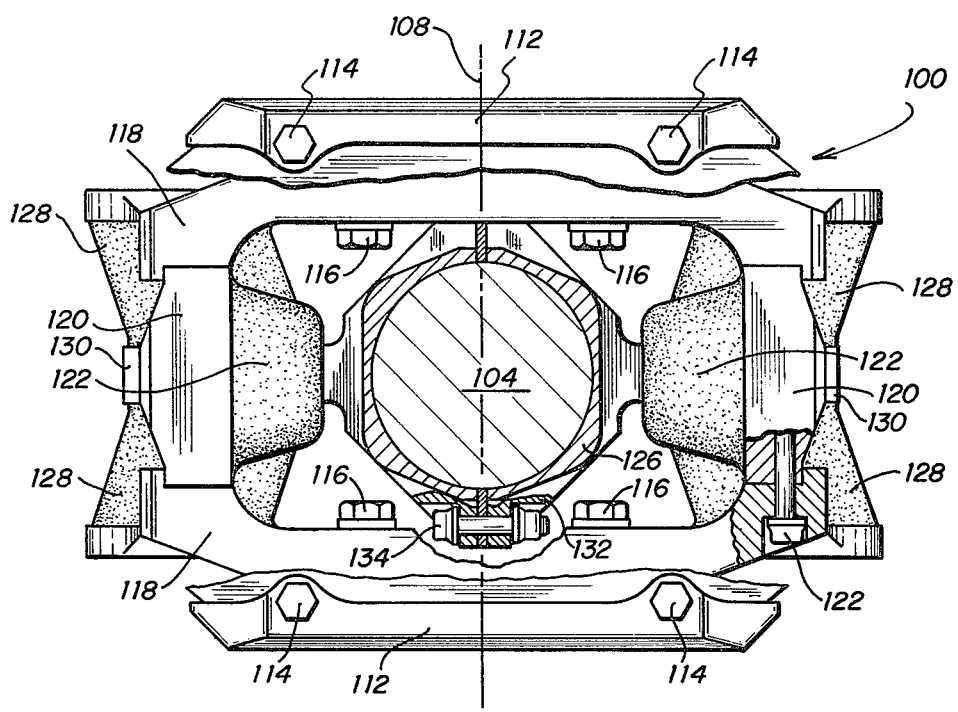
FIG. 12 is a top view of the coupling shown in FIG. 11.
Figure 13:
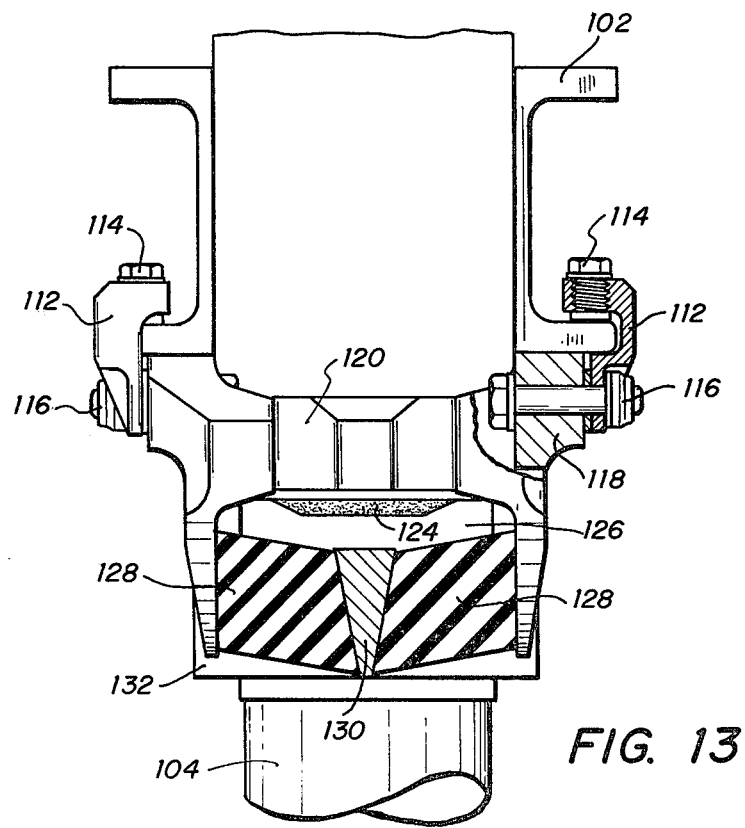
FIG. 13 is an end view of the coupling shown in FIGS. 11 and 12.

FIGS. 11, 12 and 13

FIGS. 11–13 illustrate a mast-yoke coupling 100 representing a compound hub spring structure in accordance with a third embodiment of the invention.

Coupling 100 is connected between rotor yoke 102 and main rotor mast 104. The yoke, to which helicopter blades (not shown) are attached, is mounted on mast 104 with a pillow block 106 for rotation therewith as well as for pivotal movement about a teetering axis extending through point 108. The helicopter blades (not shown) are supported by yoke 102 through blade grips 110.

Coupling 100 is attached to the underside of yoke 102 by means of two clamps 112. Each clamp 112 is secured by bolts 114 to a flange on yoke 102. Bolts 116 in turn secure clamps 112 to side members 118. End members 120 are secured by bolts 122, only one of which is shown, between the ends of side members 118. Members 118 and 120 thus comprise a generally rectangular frame which surrounds mast 104 and is attached to yoke 102.

A resilient elastomeric snubber block 124 is adhered to the inside surface of each end plate 120. Snubber blocks 124 are positioned on opposite sides of mast 104 and in predetermined spaced apart relationship therewith so as to engage the mast and apply a compression shear bias opposing blade flap beyond a predetermined angle. It will be noted that the contact surfaces of blocks 124 are substantially straight and are adpated to engage flat surfaces on a mast sleeve 126. Mast sleeve 126 is optional, however, and it will be understood that snubber blocks 122 can directly engage mast 104 and can be of any suitable nose configuration depending upon the response desired.

Four resilient elastomeric shear pads 128 are adhered between said members 118 and a pair of plates 130 mounted on a clamp ring 132 secured to mast 104 by means of bolts 134. Mast sleeve 126 is surrounded by clamp ring 132, which is preferably of split-ring construction. One elastomer shear pad 128 is thus secured between each end of the side members 118 and a plate 130. Elastomeric pads 128 thus exert a flap-opposing shear bias which is substantially linearly proportional with flapping angle. Coupling 100 otherwise functions similar to coupling 70 described above and illustrated in FIGS. 7–10.

Thus a compound hub spring system is provided wherein the spring rate increases linearly from a low rate under flight conditions such as hover where the blade flap angle is low, and then rapidly increases linearly or nonlinearly from a predetermined flap angle during flight conditions where high flap angles may occur.

Having described the invention in connection with certain specific embodiments thereof, it is to be understood that further modifications may now suggest themselves to those skilled in the art, and it is intended to cover such modifications as fall within the scope of the appended claims.

What is claimed is:

1. A rotor blade mounting for a flapping main rotor of a helicopter with a rotatable drive mast, comprising:
   a trunnion attached to the mast, said trunnion including structure extending from opposite sides thereof to define a teetering axis;
   a yoke mounted on said trunnion for pivotal movement about said teetering axis, said yoke having rotor blades attached thereto;
   first elastomeric spring means connected between said yoke and mast for continuously opposing flapping of the rotor blades with a restraining shear bias of predetermined first spring rate, said first spring means being disposed in spaced relationship with the teetering axis; and
   second elastomeric spring means mounted on said yoke to engage said mast for opposing flapping of the rotor blades beyond a preselected flapping angle with a restraining compression bias of relatively higher second spring rate so that overall the flap-opposing bias is nonlinear, said second spring means being positioned on opposite sides of the mast in spaced apart relationship with the teetering axis.

2. The rotor blade mounting of claim 1, wherein said first restraining shear bias is oriented substantially transverse to the teetering axis.

3. The rotor blade mounting of claim 1, wherein said first elastomeric spring means comprises:
   first circular flange means disposed about the teetering axis and rigidly secured to said trunnion;
   second circular flange means disposed about the teetering axis and rigidly secured to said yoke, said first and second flange means being spaced apart; and
   circular elastomeric shear pad means interconnecting said first and second flange means.

4. The rotor blade mounting of claim 1, wherein said first elastomeric spring means comprises:

a pair of cylinder means concentrically disposed about the teetering axis;

one of said cylinder means being rigidly secured to said yoke, and the other one of said cylinder means being rigidly secured to said trunnion such that said cylinder means are relatively rotatable; and cylindrical elastomeric shear pad means interconnecting said cylinder means.

5. The rotor blade mounting of claim 1, wherein said first elastomeric spring means comprises:

first arcuate flange means rigidly secured to said yoke;

second arcuate flange means rigidly secured to the mast and positioned in spaced apart relationship with said first flange means; and arcuate elastomeric shear pad means interconnecting said first and second flange means.

6. The rotor blade mounting of claim 1, wherein said first elastomeric spring means comprises:

first flange means rigidly secured to said yoke and disposed on opposite sides of the mast;

second flange means rigidly secured to the mast and disposed adjacent to said first flange means; and elastomeric shear pad means interconnecting said first and second flange means.

7. The rotor blade mounting of claim 1, wherein said second elastomeric spring means comprises:

a pair of elastomeric snubber members secured to said yoke on opposite sides of said mast, each of said snubber members being configured and positioned to engage the mast and apply a restraining compression bias that increases nonlinearly for flapping angles beyond said preselected angle.

8. The rotor blade mounting of claim 1, wherein said second elastomeric spring means comprises:

an elastomeric ring member secured to said yoke in surrounding spaced-apart relationship with said mast, said ring member having conical contact surfaces on opposite sides of said mast positioned to come into compressive engagement with said mast at said preselected flapping angle such that the restraining compression bias increases for flapping angles beyond said angle.

9. A rotor blade mounting for controlling blade flapping in a teetering main rotor of a helicopter with a rotatable drive mast, comprising:

a yoke pivoted to the drive mast for rotation therewith and for pivotal movement about a teetering axis, said yoke having the rotor blades attached thereto;

first flange means mounted on said yoke for pivotal movement therewith;

second flange means connected to the mast and positioned adjacent to said first flange means;

elastomeric shear pad means interconnecting said first and second flange means for continuously opposing flapping of the rotor blades with a restraining shear bias of first predetermined spring rate; and elastomeric spring means mounted on said yoke to engage said mast for opposing flapping of the rotor blades beyond a preselected flapping angle with a restraining compression bias of relatively higher second spring rate so that overall the flap-opposing bias is nonlinear, said second spring means being positioned on opposite sides of the mast in spaced apart relationship with the teetering axis.

10. The rotor blade mounting of claim 9, wherein said first flange means, second flange means and elastomeric shear pad means are circular and disposed about the teetering axis.

11. The rotor blade mounting of claim 9, wherein said first flange means, second flange means and elastomeric shear pad means are arcuate and disposed such that the arc centers thereof substantially intersect the teetering axis.

12. The rotor blade mounting of claim 9, wherein said first flange means, second flange means and elastomeric shear pad means are disposed beneath said yoke and extend substantially orthogonal to the mast and the teetering axis.

13. The rotor blade mounting of claim 9, wherein said elastomeric spring means comprises:

a pair of elastomeric snubber members secured to said yoke on opposite sides of said mast, each of said snubber blocks being positioned to come into compressive engagement with the mast upon reaching said preselected flapping angle such that the second restraining compression bias increases nonlinearly for flapping angles beyond said angle.

14. The rotor blade mounting of claim 9, wherein said second elastomeric spring means comprises:

an elastomeric ring member secured to said yoke in surrounding spaced-apart relationship with said mast, said ring member having conical contact surfaces on opposite sides of said mast positioned to come into compressive engagement with said mast at said preselected flapping angle such that the restraining compression bias increases for flapping angles beyond said angle.

* * * * *